J. G. VINSON.
TROLLEY HARP.
APPLICATION FILED MAR. 4, 1922.
1,427,659.
Patented Aug. 29, 1922.
2 SHEETS—SHEET 2.
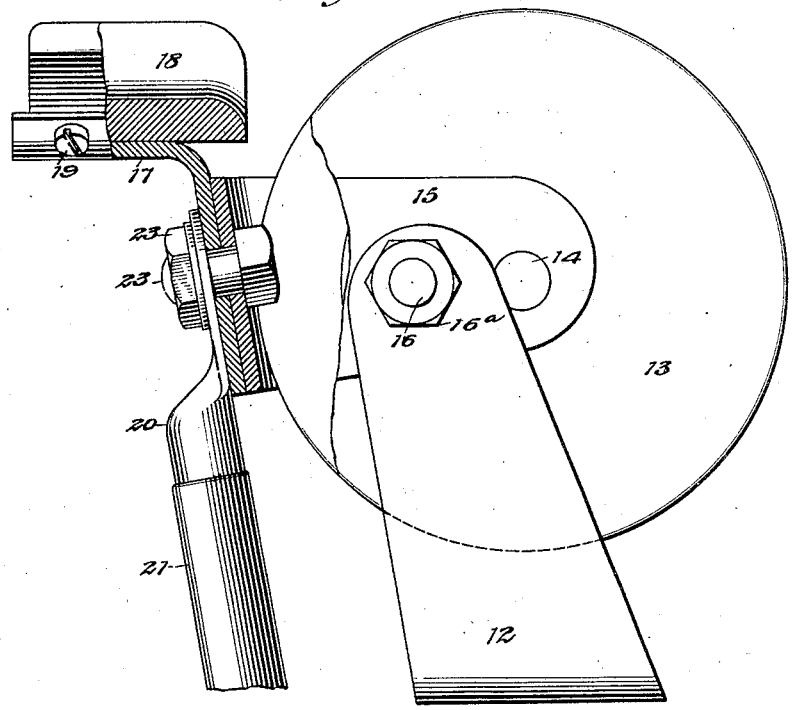
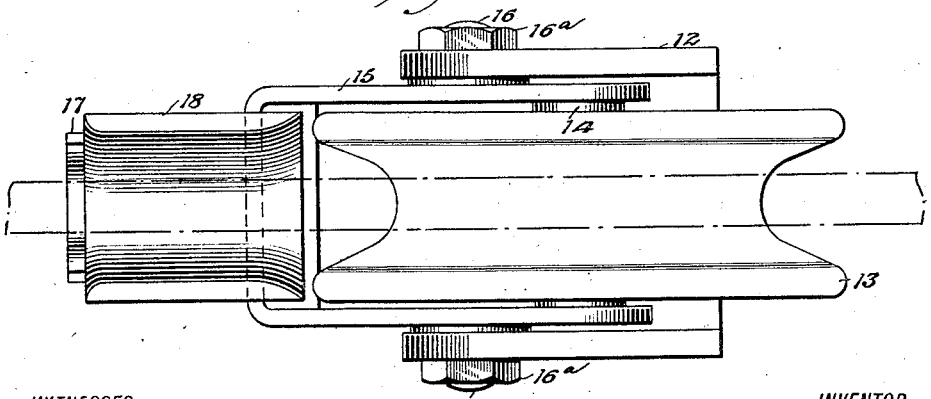
INVENTOR
J. G. VINSON

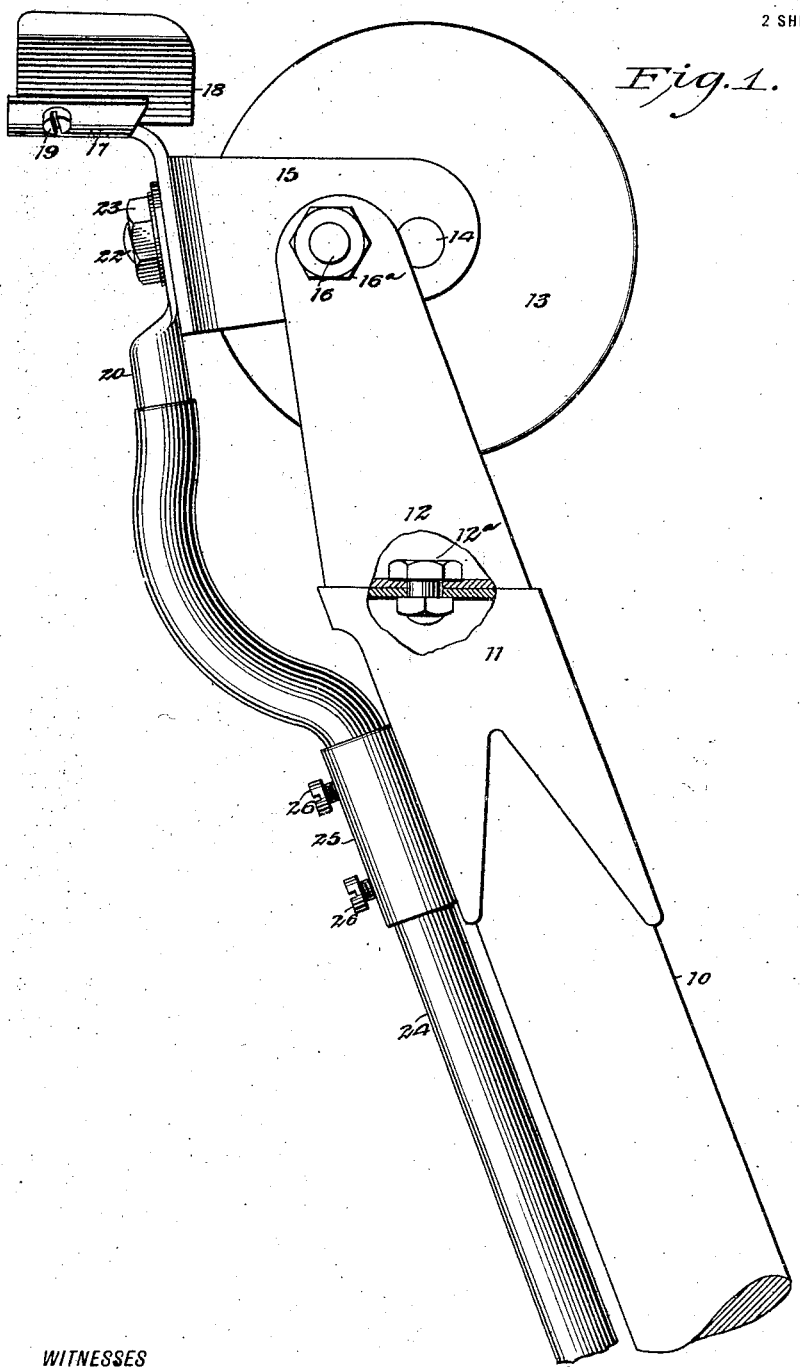

UNITED STATES PATENT OFFICE.

JAMES GROVER VINSON, OF GRAHAM, KENTUCKY, ASSIGNOR OF ONE-HALF TO ROBERT L. COLEMAN, OF GRAHAM, KENTUCKY.

TROLLEY HARP.

1,427,659.  Specification of Letters Patent.  Patented Aug. 29, 1922.

Application filed March 4, 1922. Serial No. 541,075.

*To all whom it may concern:*

Be it known that I, JAMES G. VINSON, a citizen of the United States, and a resident of Graham, in the county of Muhlenburg and State of Kentucky, have invented a new and Improved Trolley Harp, of which the following is a description.

My invention relates to trolleys and particularly to the manner of mounting the trolley wheel and of collecting the current.

With the usual trolley the wheel turns about a pin journaled directly in the fitting secured to the top of the trolley pole. This arrangement in practice, owing to the limited contact surface of the wheel and the inadequate application of the upward pressure, results in arcing and the burning out of the wheel. Also, taking of the current through the wheel pin constitutes an inadequate conducting means for the current.

The general object of my invention is to provide an improved trolley in which the wheel is so mounted on the trolley pole that the upward pressure of the pole is efficiently applied to retain the wheel in engagement with the trolley wire.

A further important object of the invention is to provide for collecting the current through the medium of a brush without relying upon the trolley wheel.

Other objects and the manner of carrying out my invention in practice will clearly appear as the description proceeds.

Reference is to be had to the accompanying drawings forming a part of this specification, it being understood that the drawings are merely illustrative of one example of the invention.

Figure 1 is a side elevation of a trolley attachment embodying my invention;

Figure 2 is a partly sectional side elevation thereof;

Figure 3 is a plan view.

In carrying out my invention in practice, in accordance with the illustrated example, a trolley pole 10 is provided with a fitting 11 at the top which may be in general of the usual construction and includes a U-shaped bracket 12 secured in position by a bolt 12ª.

The pin 14 of the trolley wheel 13 instead of being mounted directly in the bracket 12 turns in an auxiliary bracket 15 secured to the bracket 12 of the pole fitting at a point rearward of the pin 14 by studs or bolts 16 and nuts 16ª. The arrangement is such that the auxiliary bracket 15 lies transverse to the axis of the pole 10. The bracket 15 at the top has a rearwardly offset brush holder 17 disposed horizontally or approximately so in the line of the wheel 13. Said holder carries a suitable brush 18 which may be secured by a screw or screws 19.

A contact 20 constitutes the terminal of a short length of cable 21 and is secured by a bolt or stud 22 and nut 23 to the back or bend of the bracket 15 beneath the brush holder 17. The cable 21 leads to the main cable 24 connecting in practice to the fuse (not shown) connected by a suitable coupling 25 having binding screws 26 for the respective cables.

By the described construction the brush 18 as well as the wheel 13 will be pressed against the trolley wire and the wheel 13 will be effectively maintained in contact with the trolley wire by reason of its pin 14 being mounted off-center from the supporting bolts or studs 16 so that in the upward pressure due to the usual trolley spring (not shown) upward pressure will be applied through the bracket 15 so that the wheel 13 will swing through an arc.

It is to be noted that the brush holder 17 extends rearwardly from the bracket 15 and therefore rearwardly beyond the connection between the cable 21 and the bracket 15. Thus, with the wheel 13 and the brush 18 bearing against the trolley wire there is in effect a double leverage the brush being pressed upwardly by the bracket 12 theoretically swung by movements with the pin 16 as a center and on the other hand the bracket 15 and wheel 13 are carried up bodily, the bearing point of the brush 18 at the under side of the trolley wire constituting a pivot or fulcrum. The pressure forcing the brush 18 against the wire is very effectively applied but nevertheless undue pressure is not applied to the brush 18 because the connection of the brush holder is supported close to the wheel for the effective application of the upward pressure but the supporting seat of the brush holder and the brush are farther from the wheel thereby reducing the pressure exerted by the brush although insuring it at all times a pressure to maintain the brush in constant contact with the trolley wire. The current will be collected by both the wheel 13 and the brush 18, and taking the line of least resistance, the current will be afforded ample conductivity to and through the auxiliary cable 21 instead of being dependent on the wheel pin 14 and the various loose joints as in the ordinary trolley harp.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a trolley, a fitting adapted to be mounted on a trolley pole, a bracket mounted on said fitting to lie transverse to the axis of the pole, a trolley wheel mounted in said bracket forward of the connection between said bracket and said fitting, and a brush holder carried by said bracket rearward of the trolley wheel.

2. In a trolley, a fitting adapted to be mounted on a trolley pole, a bracket mounted between its ends on said fitting for vertical rocking movement, a trolley wheel on said bracket, and a brush holder on said bracket, the brush holder and trolley wheel being mounted the one forward and the other rearward of the point of connection between the fitting and the bracket.

3. In a trolley, a bracket, means to mount said bracket between its ends on a trolley pole to extend forward and rearward of the axis of the pole, a trolley wheel journaled in said bracket at the front end, and a brush holder mounted on said bracket at the rear end.

4. In a trolley, a bracket, means to mount said bracket between its ends on a trolley pole to extend forward and rearward of the axis of the pole, a trolley wheel journaled in said bracket at the front end, conducting means connected with said bracket at its rear end and adapted to conduct the current along the pole, a brush holder supported on said bracket at the rear end and extending rearwardly of the connection between the conductor and the bracket.

JAMES GROVER VINSON.